Patented June 11, 1946

2,401,772

UNITED STATES PATENT OFFICE 2,401,772

PURIFYING NITRILES

Anderson W. Ralston and Lowell T. Crews, Chicago, and Edwin W. Colt, Evanston, Ill., assignors to Armour and Company, Chicago, Ill., a corporation of Illinois No Drawing. Application May 25, 1944, Serial No. 537,370

7 Claims. (Cl. 260—464)

This invention relates to processes of purifying nitriles and it comprises processes wherein crude higher fatty acid nitriles are heated in the presence of maleic anhydride for the removal of impurities.

The manufacture of higher fatty acid nitriles from the corresponding fatty acids is now an industry of considerable magnitude. Such nitriles are made by processes broadly consisting in reacting the fatty acid with ammonia. The resulting nitriles may be distilled, or otherwise worked up to free them of any unreacted fatty acid, side-reaction products, etc. Crude fatty acid nitriles, however, are quite odoriferous, and have rather pronounced color, usually of a reddish hue. For many uses it is desirable to have nitriles which are of lighter color, and which are of more satisfactory odor. The present invention is based on discoveries of ways by which such crude nitriles can be improved with respect to color and odor.

We have now discovered that maleic anhydride has the property of reacting with, or otherwise associating itself with the color and odor-yielding bodies in such crude nitriles, and that by heating the nitrile in the presence of small amounts of maleic anhydride these impurities in the nitrile can be removed.

Our invention is applicable to the purification of all fatty acid nitriles. Commercially these have from six to eighteen or more carbon atoms, the eighteen carbon atom nitriles such as those from stearic or oleic acid being especially valuable materials commercially. The nitriles of fish oil fatty acids, having as many as 26 carbon atoms, are also important materials. Our invention includes the treatment of any of the fatty acid nitriles, saturated and unsaturated, and having at least 6 carbon atoms.

We shall now describe a specific practice of our invention with reference to the purification of oleic acid nitrile, since this is representative of the fatty acid nitriles as a whole.

To 100 parts of the oleic acid nitrile we add about 1 to 2 parts of maleic anhydride and then heat this mixture to a temperature of about 175° C. for a short period of time, 10 minutes being generally sufficient. Under these conditions the maleic anhydride combines with the color and odoriferous constituents in the nitrile. Thereafter the nitrile is allowed to cool down, is washed with water to remove water-soluble reaction products of the maleic anhydride and the impurities in the nitrile, and, if desired, the nitrile is thereafter distilled.

The elevated temperature above referred to is not critical, but the higher temperatures do speed up the combination of the maleic anhydride with the impurities.

Advantageously, the temperature is from about 100° C. to 200° C., but below the boiling point of the nitrile, in the nitrile.

Nor is the amount of added maleic anhydride critical. One or two percent is usualy enough since the amount of impurities in the nitrile is relatively small. More maleic anhydride can be added if one or two percent appears insufficient to improve the color and odor.

All the other fatty acid nitriles can be purified in substantially the same manner.

Having thus described our invention, what we claim is:

1. The process of purifying a fatty acid nitrile which comprises heating the nitrile with a small amount of maleic anhydride and washing the thus treated nitrile with water.

2. The process of purifying a fatty acid nitrile which comprises heating the nitrile to a temperature of about 100° C. to 200° C., but below the boiling point of the nitrile, in the presence of a small amount of maleic anhydride, and washing the thus treated nitrile with water.

3. The process of purifying a fatty acid nitrile which comprises heating the nitrile with a small amount of maleic anhydride, washing the thus treated nitrile with water, and distilling the nitrile.

4. The process of purifying a fatty acid nitrile which comprises heating the nitrile to a temperature of about 100° C. to 200° C., but below the boiling point of the nitrile, in the presence of a small amount of maleic anhydride, washing the thus treated nitrile with water, and distilling the nitrile.

5. In a process for purifying a fatty acid nitrile the step of heating the nitrile in the presence of maleic anhydride.

6. In a process for purifying a fatty acid nitrile the step of heating the nitrile to a temperature of about 100° to 200° C. but below the boiling point of the nitrile in the presence of maleic anhydride.

7. A process of purifying a fatty acid nitrile which comprises heating the nitrile in the presence of maleic anhydride to form reaction products of said maleic anhydride with impurities contained in the nitrile, and removing said reaction product from the nitrile.

ANDERSON W. RALSTON.
LOWELL T. CREWS.
EDWIN W. COLT.